(12) United States Patent
Schlueter et al.

(10) Patent No.: US 6,915,060 B2
(45) Date of Patent: Jul. 5, 2005

(54) CABLE HOLDER

(75) Inventors: Malte Schlueter, Leinfelden (DE); Jens Heitkamp, Gaeufelden (DE); Tobias Ruf, Renningen (DE)

(73) Assignee: Agilent Technologies Inc., Palo Alto, CA (US)

( * ) Notice: Subject to any disclaimer, the term of this patent is extended or adjusted under 35 U.S.C. 154(b) by 117 days.

(21) Appl. No.: 10/272,198

(22) Filed: Oct. 16, 2002

(65) Prior Publication Data

US 2003/0091317 A1 May 15, 2003

(30) Foreign Application Priority Data

Nov. 10, 2001 (EP) .............................................. 01126830

(51) Int. Cl.⁷ .............................. G02B 6/00; G02B 6/46
(52) U.S. Cl. .......................... 385/137; 385/76; 385/139
(58) Field of Search ...................... 385/53–94, 134–137

(56) References Cited

U.S. PATENT DOCUMENTS

| | | | |
|---|---|---|---|
| 4,186,997 A | * 2/1980 | Schumacher | ................. 385/65 |
| 4,629,284 A | 12/1986 | Malavieille | .............. 350/96.21 |
| 4,986,626 A | * 1/1991 | Bossard | ........................ 385/76 |

FOREIGN PATENT DOCUMENTS

| | | | |
|---|---|---|---|
| DE | 4423842 A1 | 3/1995 | |
| JP | 08248253 A | * 9/1996 | ............ G02B/6/24 |

OTHER PUBLICATIONS

Patent Abstracts of Japan document No. 63233346.

* cited by examiner

Primary Examiner—Michelle R. Connelly-Cushwa

(57) ABSTRACT

A cable holder, in particular for fiber optics cables, includes a base piece that contains a cable receiving duct that is open on top and axially, into which a cable can be loaded, and a cover piece that provides a retaining structure and that is hinged on the base piece to swivel from an open position into a closed position around a swivel axis. In the open position of the cover piece, the cover piece sticks out from the base piece and the cable is loadable into the cable receiving duct. In the closed position of the cover piece, the cover piece extends along the base piece and the retaining structure localizes the loaded cable on the cable receiving duct. The swivel axis extends in the area of one axial end of the cable receiving duct perpendicular to the longitudinal direction of the cable receiving duct and/or perpendicular to the longitudinal direction of the cable.

15 Claims, 3 Drawing Sheets

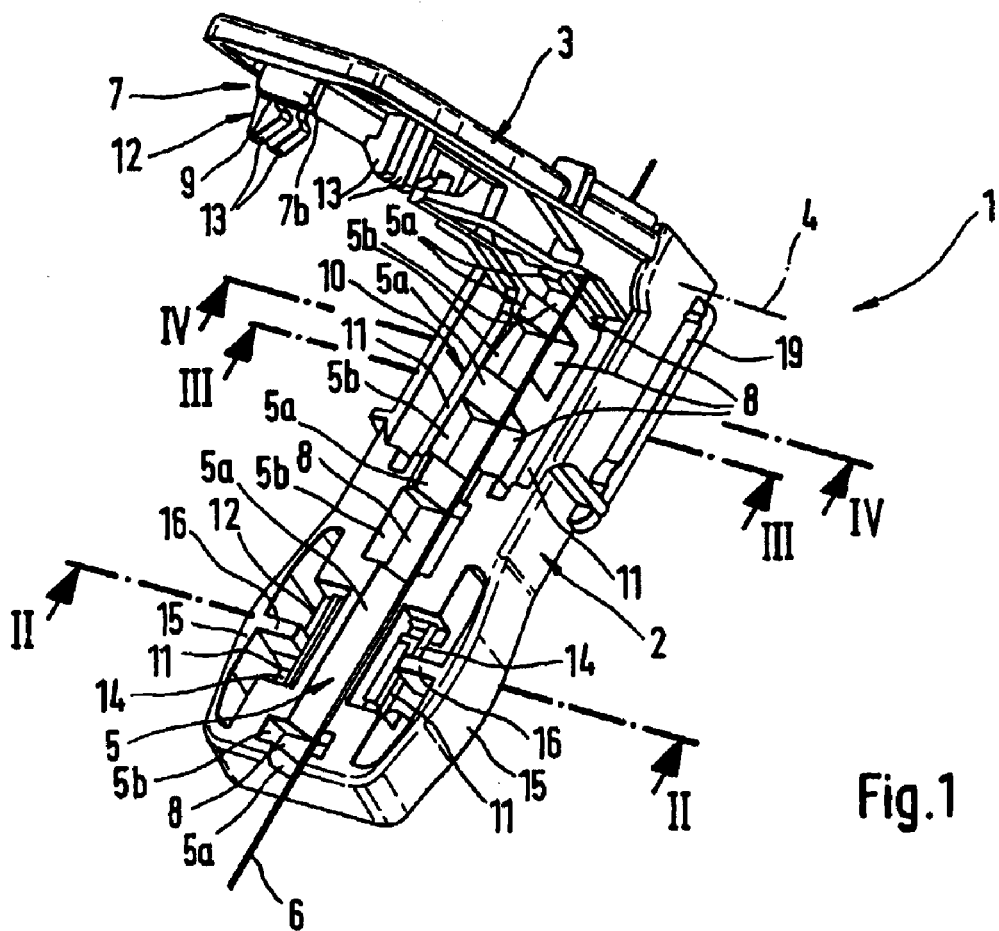
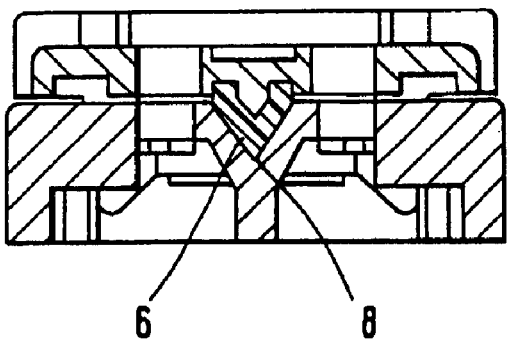
Fig.1
Fig.2

CABLE HOLDER

BACKGROUND OF THE INVENTION

The current invention concerns a cable holder, in particular for optical fiber cables.

A device for connecting optical fibers is known from U.S. Pat. No. 4,629,284. JP-A-63 233346 shows a cable holder as a plug for non-insulated fibers.

Cable holders are used, for example, when optical parts are to be tested and/or gauged with respect to their proper function, in particular after fabrication. Usually, a vast number of fiber optic cables must be connected to an appropriate measuring and/or testing device for this purpose. For improved manipulability, the optical fiber cables are equipped on one cable end with a cable holder of the abovementioned type for connecting to the measuring and/or testing device. This holder appropriately forms a plug that can be plugged into a corresponding socket on the measuring and/or testing device. This ensures the highest quality optical signal transfer possible when taking readings.

SUMMARY OF THE INVENTION

The object of the present invention is to provide an improved design for a cable holder. This object is solved by the features of the independent claims. Preferred embodiment are shown by the dependent claims.

The current invention is based on the approach of equipping the cable holder with a cover piece and base piece that are mounted to pivot around a swivel axis that runs perpendicular to the cable held within the cable holder.

The base piece contains a cable receiving duct into which the cable can be loaded. The cover piece contains a retaining structure that interacts with the cable receiving duct to localize the loaded cable when pivoting the cover piece into its closed position, which is adjacent to the base piece. It has been shown that through the suggested orientation of the swivel axis, the implementation of a flat and compact cable holder, for example, is simplified. Consequently, the cable holder, for example, can provide its largest dimension in the direction of the cable, whereby closing the cover piece is done by means of a relatively large lever and subsequently executable manually with ease.

In order to improve the operability of the cable holder, according to a subsequent design a preset position close to the open position of the cover piece can be designed, or defined through the contour of the retaining structure, in which the cable loaded into the cable receiving duct presets on the cable receiving duct within the area of the swivel axis and is still movable within the rest of the cable receiving duct. This makes the cable to be loaded relatively easy to thread and/or introduce into the cable receiving duct when the cover piece is completely open and particularly easy to position accurately within the cable receiving duct, for example by means of tensile force, after the cover piece has been moved into the preset position.

In a particularly favorable design, the cable receiving duct can provide at least one guide section that has a profile section that tapers to a duct base and in which the cable loaded therein is laterally guided and supported. Moreover, the cable receiving duct can provide at least one positioning section, in which the duct base is designed parallel to the swivel axis level and wider than the cable. In a corresponding manner, the retaining structure can provide a guide area for each guide section of the cable receiving duct that has a profile section that tapers to the cable receiving duct and penetrates the assigned guide section when closing the cover piece. The retaining structure also then has a positioning area for each positioning section of the cable receiving duct that penetrates the assigned positioning section when closing the cover piece and that provides a surface facing the cable receiving duct that is designed parallel to the swivel axis level and wider than the cable. When the cover piece is moved to its closed position, the level surfaces of the retaining structure push the cable in the direction of the duct base, wherein the cable is lead lateral to the duct center in the sections of the cable receiving duct that taper to the duct base. This type of construction subsequently aids optimal, linear and centered alignment of the cable within the cable receiving duct such that with the cover piece closed, the probability that the cable will occupy its predetermined position is very high.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

It is shown schematically in:

FIG. 1 a perspective view of a cable holder according to the invention with a cover piece pivoted into its open position, FIGS. 2–4 cross-sectional views through the cable holder with a cover piece pivoted into its closed position according to section boundaries I, II, III and IV in FIG. 1 respectively, FIG. 5 a perspective view of a section of a device to which the cable is attachable, and FIG. 6 a perspective view of an apparatus into which the cable holder is loadable.

DETAILED DESCRIPTION OF THE PREFERRED EMBODIMENTS

Figure 3:
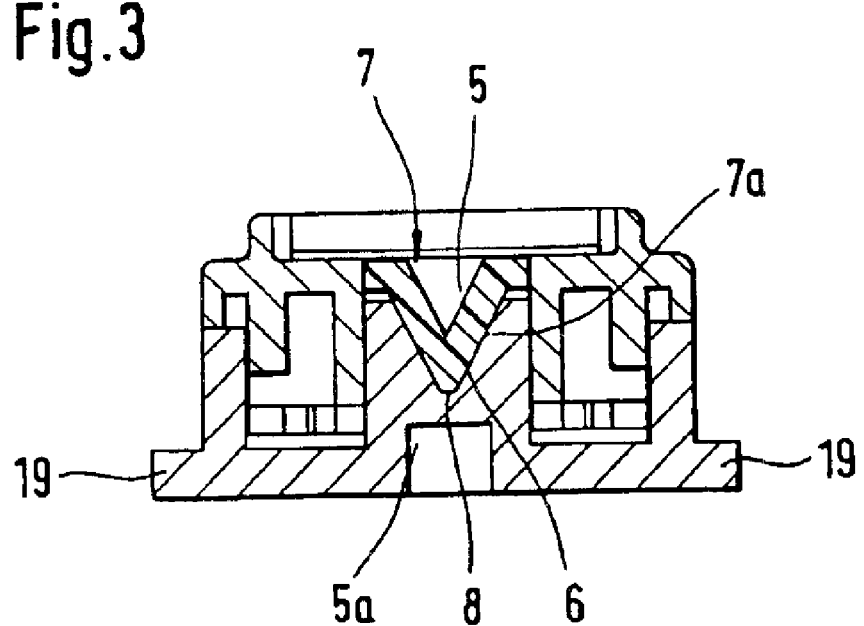

In FIG. 1 a cable holder 1 according to the invention provides a base piece 2 and a cover piece 3. The cover piece 3 is mounted to be able to pivot around a swivel axis 4 on the base piece 2 from an open position shown in FIG. 1 to a closed position.

The base piece 2 contains a cable receiving duct 5 that extends straight and is designed open at its axial ends. In addition, the cable receiving duct 5 is designed open along its entire length on the side facing the cover piece 3. Accordingly, in the open position of the cover piece 3, a cable 6, which is preferably a fiber optics cable or optical fiber respectively, can be loaded into the cable receiving duct 5, which then extends coaxially to the cable receiving duct 5. Usually, only one end or end section of the cable 6 is loaded into the cable holder 1. The cover piece 3 provides a retaining structure 7 on its side facing the base piece 2, thus underneath here, that penetrates into the cable receiving duct 5 when the cover piece 3 is closed and the cable 6 loaded therein localizes on the cable receiving duct 5.

It is of particular importance here that the, swivel axis 4 is arranged in the area of an axial end of the cable receiving duct 5 and runs perpendicular, therefore vertical to the longitudinal direction of the cable receiving duct 5 and subsequently transverse to the longitudinal direction of the cable as well. The swivel axis 4 may intersect the loaded cable 6 at the same time.

Figure 4:
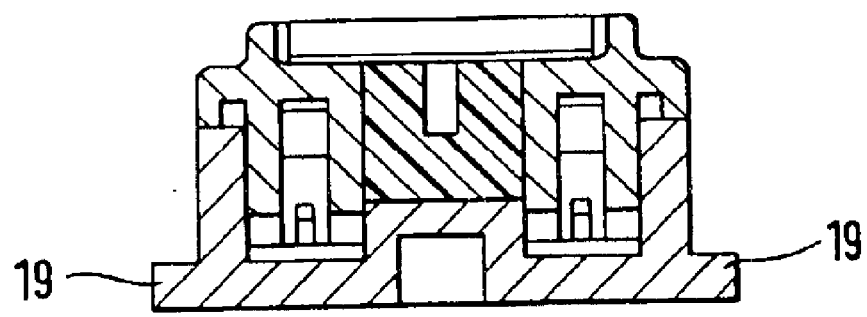

As can be seen from FIG. 1 and the cross-sectional views of FIGS. 2 through 4, the cable receiving duct 5 has several guide sections 5a that each provide a profile section that tapers in a V-shape to the duct base 8. These guide sections 5a form a lateral guide for the loaded cable 6 relative to the longitudinal direction of the cable 6 and additionally a lateral support as well when cover piece 3 is closed.

The cable receiving duct 5 contains a positioning section 5b between each two such guide sections 5a, in which the duct base 8 is formed level respectively and extends parallel to the swivel axis 4, wherein the duct base 8 in the positioning sections 5b adjacent to cable 6 is dimensioned considerably larger than the cable 6.

Complementary to the guide sections 5a, the retaining structure 7 has guide sections 7a that according to FIGS. 2 and 3 each provide a profile section, in particular V-shaped, that tapers to the cable receiving duct 5. Additionally, the retaining structure 7 has positioning areas 7b corresponding to the positioning sections 5b that each provide a surface 9 that faces the cable receiving duct 5, that each run—like the duct base 8 in the positioning sections 5b—level and parallel to the swivel axis 4 and that are dimensioned larger than the cable 6 toward the swivel axis 4.

The cable receiving duct 5 and the retaining structure 7 interact as follows when the cover piece 3 is closed:

When the cover piece 3 is pivoted from the open position, in which the cover piece 3 sticks out from the base piece 2, into the closed position, in which the cover piece 3 extends along the base piece 2, the guide areas 7a of the retaining structure 7 penetrate the assigned guide sections 5a of the cable receiving duct 5. The positioning areas 7b of the retaining structure 7 also penetrate the respective positioning sections 5b of the cable receiving duct 5 in a corresponding manner. If the cable 6 is still not centered optimally on the duct base 8 during this closing action, the foregoing surfaces 9 of the positioning areas 7b function as cams and push the cable 6 towards the base duct 8. The side flanks of the guide sections 5a, which taper to the duct base 8, thereby produce a lateral guide for the cable 6, through which it is led to the center of the duct base 8. For this purpose, the surfaces 9 of the positioning areas 7b stick out at least equally as far from the cover piece 3 towards the base piece 2 as the guide areas 7a. Instead of a surface 9, the respective positioning area 7b can also provide another optional contour that extends parallel to the swivel axis 4 straight or level respectively.

When the cover piece 3 is completely moved to its closed position, the cable 6 is aligned centrally on the canal duct 8. The retaining structure 7 is dimensioned subsequently such that the cable 6 is braced radial with the cable receiving duct 5 in the closed position of the cover piece 3, which causes the formation of a clamped or frictional attachment of the cable 6 in the cable receiving duct 5.

The contour of the retaining structure 7 can be selected such that a preset position for the cover piece 3 is defined that is suitably located close to the open position. Whereas the cable 6 can be threaded in the open position of the cover piece 3 within the area of the swivel axis 4 with particular ease and is adjustable especially in its longitudinal direction in the cable receiving duct 5, the preset position of the cover piece 3 presets the cable 6 on the cable receiving duct 5 in the area of the swivel axis 4, which prevents the cable 6 from being moved in its longitudinal direction. At the same time the cable 6 can be moved laterally to facilitate the manual alignment of the cable 6 in the cable receiving duct 5. A tensile force can be exerted manually on the cable 6, for example, causing the cable to be stretched and aligned straight. Such a preset position can be realized, for example, by the retaining structure 7 sticking out further from the cover piece 3 in a section designed close to the swivel axis 4 in the direction of base piece 2 than in the adjacent sections further away from the swivel axis 4.

A benefit of the retaining structure 7 is that it is made from an elastic substance like an elastomer plastic, for example. The retaining structure 7 may by all means consist of another substance than the cover piece 3. For example, the retaining structure 7 can be molded onto the cover piece 3 or vice versa.

In a preferred embodiment the cover piece 3 can be mounted detachable on the base piece 2. For example, the cover piece 3 has hooks within the area of the swivel axis 4 that are open in a certain radial direction relative to the swivel axis 4 and that are attachable and/or detachable onto bearing pins, which are mounted on the base piece 2 coaxial to the swivel axis 4. The cover piece 3 is mounted and/or removed appropriately in a swivel position, which surpasses the open position according to FIG. 1. A removable cover piece 3 can be an advantage when the cable holder 1 is used to position the cable 6 in a splicing apparatus and supposed to be removed from the cable 6 again after the splicing process.

In another particularly cost-efficient design the cover piece 3 may also be hinged on the base piece 2 by means of an integral hinge. The cover piece 3 and base piece 2 can then appropriately be fabricated as a unit or one piece by means of injection molding, for example.

In order to make handling the cable holder 1 easier, it contains a spring 10, which is designed here as a hinge spring with two sides 11. The spring 10 is arranged to preload the cover piece 3 into its open position.

A lock 12 provided to keep the cover piece 3 in its closed position catches when the closed position is reached and localizes the cover piece 3 to the base piece 2. If the cable holder 1 is designed as a one-way part, this lock 12 can be made permanent. If the cable holder 1 is designed as a multiple part, the lock 12 is made removable.

The lock 12 has several snap-fits 13 here that are arranged on the cover piece 3 and that stick out in the direction of the base piece 2 from the cover piece 3. A holding element 14 is provided on the base piece 2 for every two parallel arranged snap-fits 13 that interacts with the assigned snap-fits 13 when closing the cover piece 3. As soon as the cover piece 3 reaches its closed position, the snap-fits 13 catch behind the holding elements 14. In the embodiment shown here the holding elements 14 are formed by end sections of the sides 11 of the spring 10, whereby the spring 10 receives a double function.

To disengage the lock 12, the holding elements 14 parallel to the swivel axis 4 are designed releasable from the snap-fits 13. For this purpose there is a release key 15 molded to the base piece 2 for each holding element 14 that are each fastened on base piece 3 moveable in the direction of the cable duct 5 parallel to the swivel axis 4. On the interior side facing the holding element 14 each release key 15 bears a protrusion 16, which arranges radial on the holding element 14 when the release key 15 parallel to the swivel axis 4 is activated and releases it from the respective snap-fits 13. The spring elasticity of the spring side 11 causes the spring side sections serving as holding elements 14 to automatically move back to their engaged position. Due to their material properties the release keys 15 also position themselves back to their non-activated start position. The arrangement of the release keys 15 is selected here for the benefit of being able to be activated, for example, between the thumb and the pointer finger by moving them towards each other. A special feature here additionally is that the protrusions 16 each extend between two parallel snap-fits 13 in the closed position of the cover piece 3, through which snap-fits 13 and protrusions 16 mutually stabilize each other. The release keys 15 are suitably designed as a unit or one piece on the base piece 2.

Preferably, base piece 2 and cover piece 3 are designed mirror symmetrically relative to a longitudinal central plane of the cable receiving duct 5 that stands perpendicular on the swivel axis 4.

Figure 5:
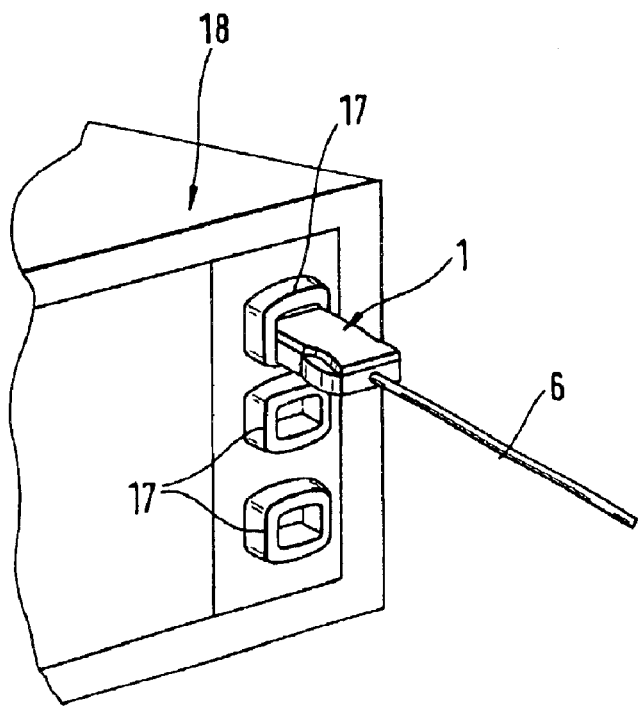

According to FIG. 5, in a preferred application the cable holder 1 forms a plug in the closed position, in which the cable 6 is mounted in a predetermined manner. This plug (cable holder 1) can be plugged into a socket 17 of a measuring and/or testing device 18 for measuring and/or testing the cable 6 and/or a part connected to it, for example.

Figure 6:
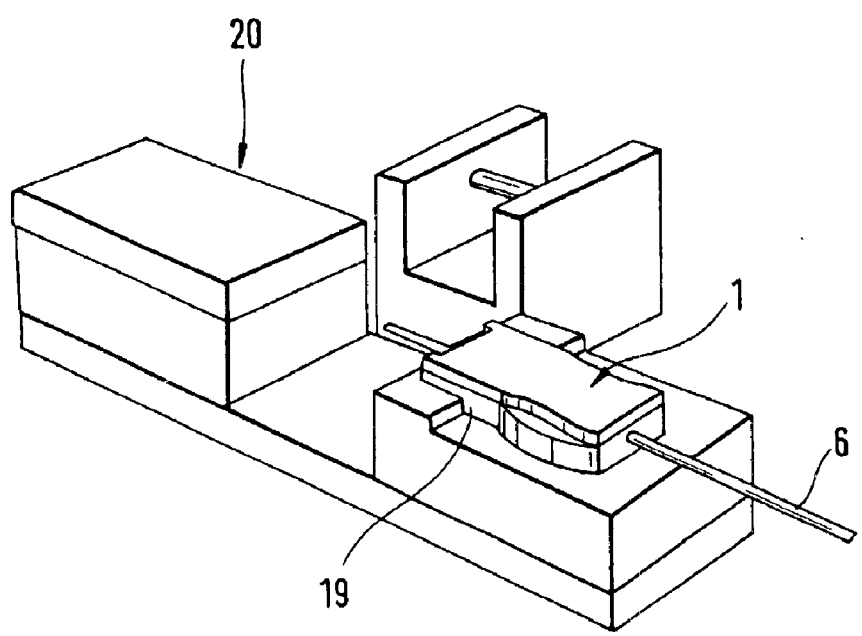

According to FIG. 6 the cable holder 1 can be adapted by means of tracks 19 (compare also FIGS. 1, 3 and 4) to a apparatus 20 that is used to handle the cable 6, in particular an optical fiber that runs within the cable. 6, e.g. glass fiber. This apparatus 20 can be designed to strip the insulation of the cable 6 and/or cut the optical fiber and/or to splice the optical fiber, for example. The cable holder 1 can be localized on the device by means of tracks 19 and thereby provides the necessary positioning of the cable 6 within the apparatus 20. By adapting the cable holder 1 to the apparatus 20 the cable 6 can remain in the cable holder 1 after it is handled within the apparatus 20, thereby always guaranteeing a defined position for the cable 6 within the cable holder 1. This is advantageous particularly if the cable is to be connected to the device 18 of FIG. 5 after it is handled in the apparatus 20, for example.

It becomes particularly clear from the design according to FIG. 6 that the cable holder 1 according to the invention builds very compact and in particular flat. The cable holder 1 is subsequently considerably larger in a width measured parallel to the swivel axis 4 than in a height measured perpendicular to the swivel axis 4 and perpendicular to the cable receiving duct 5. A length for the cable holder 1 measured in the longitudinal direction of the cable receiving duct 5 can be chosen to be relatively large in order to attain a defined positioning of the cable 6 in the cable holder 1.

The cable holder 1 according to the invention can be produced especially cost-efficiently, making it from plastic, for example. The orientation selected for the swivel axis 4 thereby enables a compact design that can be handled easily. For example, the arrangement of the swivel axis 4 selected enables relatively large closing forces to be conducted onto the cover piece 3 and base piece 2, such that the cable holder 1 can be closed comfortably by hand.

What is claimed is:

1. A cable holder for optical fiber cable comprising:
   a base piece having a cable receiving duct that is open on top and axially, and includes at Least one guide section with a profile section that tapers to a duct base adapted to receive a cable, and
   a cover piece mounted on the base piece, having a retaining structure and adapted to swivel around a swivel axis,
   wherein the swivel axis is located proximate one axial end of the cable receiving duct and substantially perpendicular to a longitudinal direction of at least one of: the cable receiving duct or the cable,
   wherein the cover piece is adapted to swivel around the swivel axis from an open position, in which the cover piece sticks out from the base piece and in which the cable can be leaded into the cable receiving duct, to a closed position, in which the cover piece extends along the base piece and in which the retaining structure localizes the loaded cable in the profile section that tapers to the duct base,
   wherein the retaining structure provides a guide area for each guide section of the cable receiving duct that has a profile section that tapers to the cable receiving duct and that penetrates the assigned guide section when closing the cover piece,
   and wherein the retaining structure provides a positioning area for each of at least one positioning section of the cable receiving duct that penetrates the assigned positioning section when closing the cover piece and that provides a contour or surface facing the cable receiving duct that is designed parallel to the swivel axis straight and/or level and wider than the cable.

2. The cable holder according to claim 1, wherein a preset position is defined by a contour of the retaining structure, in which the cable inlaid into the cable receiving duct is preset on the cable receiving duct proximate the swivel axis and can be moved laterally to the cable receiving duct in a portion of the cable receiving duct extending from the swivel axis.

3. The cable holder according to claim 1, wherein the retaining structure sticks out further from the cover piece in the direction of the base piece in a section proximate the swivel axis than in an adjacent section.

4. The cable holder according to claim 1, wherein the retaining structure operates to position the cable on the cable receiving duct proximate the swivel axis.

5. The cable holder according to claim 1, wherein
   the cable receiving duct provides the at least one positioning section, in which the duct base parallel to the swivel axis is designed level and wider than the cable.

6. The cable holder according to claim 1, wherein the cover piece is detachably mounted on the base piece.

7. The cable holder according to claim 1, further comprising at least one spring positioned to preload the cover piece into its open position.

8. The cable holder according to claim 1, further comprising a lock operable to localize the cover piece in its closed position on the base piece.

9. The cable holder according to claim 8, wherein the lock includes at least one snap-fit that in the cover piece closed position catches behind a holding element, wherein the holding element can be released from the snap-fit to release the lock.

10. The cable holder according to claim 9, wherein the holding element is formed by a spring piece that can be positioned spring-elastically between a locked position, in which it can be caught from behind by the snap-fit and an unlocked positions in which it releases the snap-fit.

11. The cable holder according to claim 10, wherein the spring piece comprises a hinge spring that is adjustable to disengage the lock.

12. The cable holder according to claim 9, wherein a release key is arranged on the base piece or on the cover piece that when activated to release the holding element from the snap-fit operates the holding element.

13. The cable holder according to claim 1, wherein the retaining structure comprises an elastic material.

14. A measuring and/or testing device for measuring and/or testing electric and/or optical components or devices comprising:
   at least one socket that is designed complementary to a cable holder for optical fiber cable, the cable holder having:

a base piece having a cable receiving duct that is open on top and axially, and includes at least one guide section with a profile section that tapers to a duct base adapted to receive a cable, and a cover piece mounted on the base piece, having a retaining structure and adapted to swivel around a swivel axis, wherein the swivel axis is located proximate one axial end of the cable receiving duct and substantially perpendicular to a longitudinal direction of at least one of: the cable receiving duct or the cable, wherein the cover piece is adapted to swivel around the swivel axis from an open position, in which the cover piece sticks out from the base piece and in which the cable can be loaded into the cable receiving duct, to a closed position, in which the cover piece extends along the base piece and in which the retaining structure localizes the loaded cable in the profile section that tapers to the duct base, wherein the retaining structure provides a guide area for each guide section of the cable receiving duct that has a profile section that tapers to the cable receiving duct and that penetrates the assigned guide section when closing the cover piece, wherein the retaining structure provides a positioning area for each of at least one positioning section of the cable receiving duct that penetrates the assigned positioning section when closing the cover piece and that provides a contour or surface facing the cable receiving duct that is designed parallel to the swivel axis straight and/or level and wider than the cable, and wherein the cable holder is plugged into the socket in the manner of a plug and socket connection for an optical and/or electric signal transfer.

15. A socket for a measuring and/or testing device for measuring and/or testing electrical and/or optical components or devices, wherein the socket is designed complementary to a cable bolder having:

a base piece having a cable receiving duct that is open on top and axially, and includes at least one guide section with a profile section that tapers to a duct base adapted to receive a cable, and a cover piece mounted on the base piece, having a retaining structure and adapted to swivel around a swivel axis, wherein the swivel axis is located proximate one axial end of the cable receiving duct and substantially perpendicular to a longitudinal direction of at least one of: the cable receiving duct or the cable, wherein the cover piece is adapted to swivel around the swivel axis from an open position, in which the cover piece sticks out from the base piece and in which the cable can be loaded into the cable receiving duct, to a closed position, in which the cover piece extends along the base piece and in which the retaining structure localizes the loaded cable in the profile section that tapers to the duct base, wherein the retaining structure provides a guide area for each guide section of the cable receiving duct that has a profile section that tapers to the cable receiving duct and that penetrates the assigned guide section when closing the cover piece, wherein the retaining structure provides a positioning area for each of at least one positioning section of the cable receiving duct that penetrates the assigned positioning section when closing the cover piece and that provides a contour or surface facing the cable receiving duct that is designed parallel to the swivel axis straight and/or level and wider than the cable, and wherein the cable holder is plugged into the socket in the manner of a plug and socket connection for an optical and/or electric signal transfer.

* * * * *